HYDRAULIC CONTROL APPARATUS

Original Filed Dec. 31, 1954 7 Sheets-Sheet 1

INVENTORS
FRANK J. FURMAN
HUGO A. PANISSIDI

BY

J. R. Mosser
AGENT

HYDRAULIC CONTROL APPARATUS

Original Filed Dec. 31, 1954 7 Sheets-Sheet 2

TIMING CHART

HYDRAULIC CONTROL APPARATUS

Original Filed Dec. 31, 1954 7 Sheets-Sheet 4

HYDRAULIC CONTROL APPARATUS
Original Filed Dec. 31, 1954 7 Sheets-Sheet 5
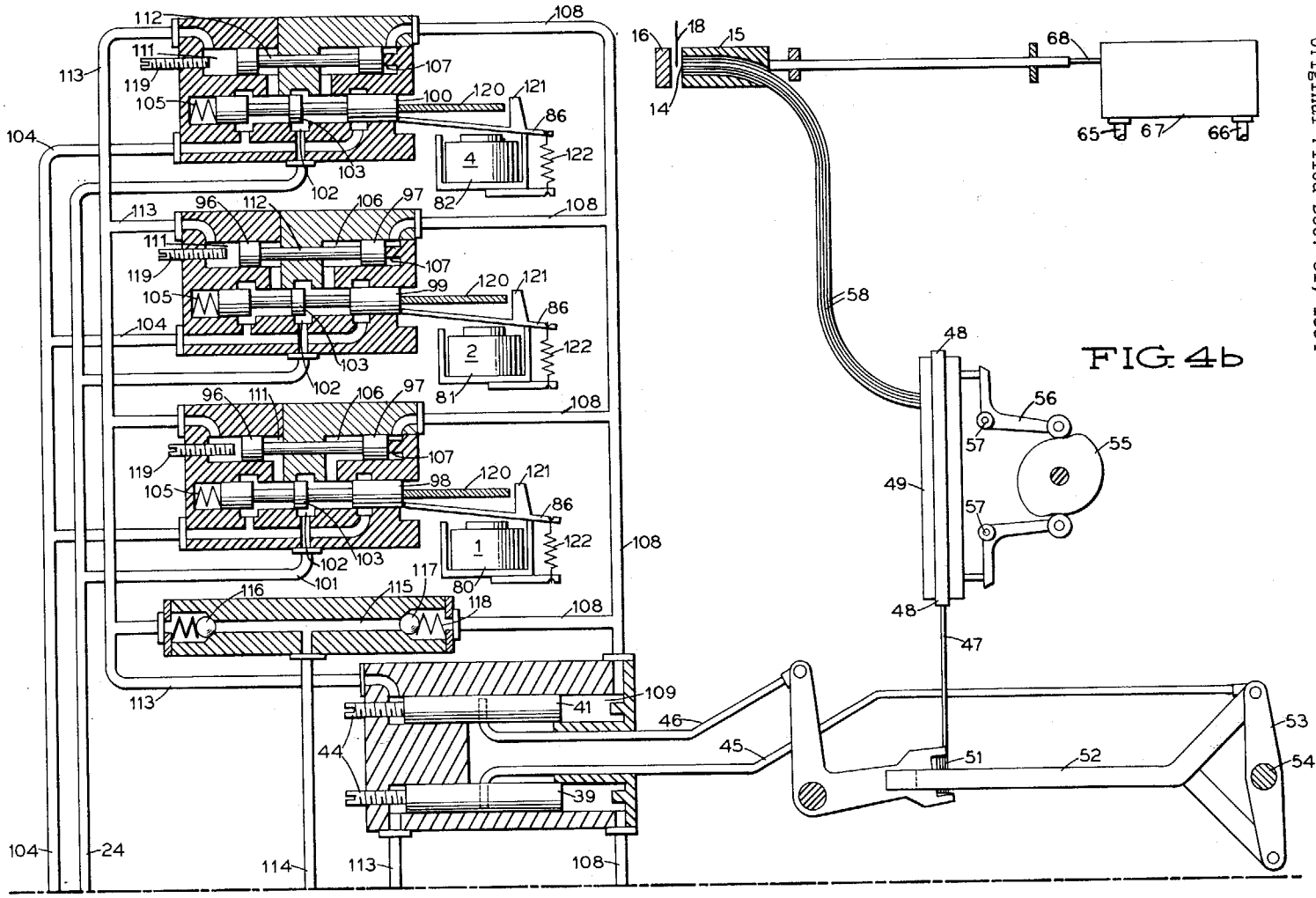

HYDRAULIC CONTROL APPARATUS

Original Filed Dec. 31, 1954 7 Sheets-Sheet 6

HYDRAULIC CONTROL APPARATUS

Original Filed Dec. 31, 1954 7 Sheets-Sheet 7

United States Patent Office

Re. 25,700
Reissued Dec. 15, 1964

25,700
HYDRAULIC CONTROL APPARATUS

Frank J. Furman, Endicott, and Hugo A. Panissidi, Peekskill, N.Y., assignors to International Business Machines Corporation, New York, N.Y., a corporation of New York Original No. 2,923,131, dated Feb. 2, 1960, Ser. No. 479,112, Dec. 31, 1954. Application for reissue Jan. 26, 1962, Ser. No. 170,306
27 Claims. (Cl. 60—54.5)

Matter enclosed in heavy brackets [ ] appears in the original patent but forms no part of this reissue specification; matter printed in italics indicates the additions made by reissue.

The invention relates to hydraulic control systems and apparatus and more particularly to hydraulic control systems and apparatus for quickly adjusting or shifting a controlled element or elements to one of a plurality of preselected positions.

It is one of the objects of the invention to provide hydraulic control apparatus which insures a constant volume of liquid in the control system.

One application of the improved hydraulic control apparatus relates to code rod setup mechanisms or means for wire printers. Heretofore, various means have been proposed to operate code rod units for wire printers which for the most part involve electromechanical arrangements. In these arrangements electrical control pulses are effective to selectively energize certain magnets or the like, which in turn operate to permit positioning of related mechanical links, interposers and the like to actuate or shift an associated code rod to any one of a predetermined number of positions. After positioning, the code rod is laterally shifted in any suitable manner to axially shift certain of the aligned wires in each matrix to set up the desired character in a remotely located reciprocatable print head. Reciprocation of the print head results in printing of the selected character on a suitable paper and such printing action returns the character forming wires to their normal retracted positions.

As higher printing speeds are demanded, inertia and wear of the mechanical portions of these setup mechanisms along with other physical limitations become a serious problem. In addition, with the use of a greater number of characters in each line, the direct coupling between the setup mechanism and code rod presents problems with respect to space requirements.

The hydraulic code rod setup mechanism as set forth in this invention utilizes any suitable code rod, lateral actuating mechanism therefor, print head driving means and other necessary control means. This invention is primarily directed to the hydraulic setup means for selectively rotating or axially shifting, or simultaneously doing both, the code rod for a wire printer to one of a predetermined number of positions.

This setup mechanism includes a pair of driven or setup pistons for each code rod or character to be printed. One setup piston is directly connected to the code rod to longitudinally or axially shift the same predetermined increments, while the other is connected to the code rod through a rack and pinion to selectively rotate the rod about its longitudinal axis. Each setup piston is hydraulically coupled through a liquid column to an independent set of three control pistons which are disposed in individual control piston chambers. Each control piston is mounted in its chamber to provide different displacements or increments of setup piston movement under the selective control of individual control pulse receiving or setup magnets. In one form, this includes magnetically operated valve means.

The operation of the setup mechanism is synchronized with the printer and the actuation of one or more of the setup magnets results in the opening of related valves which in turn permit the associated control piston to move a preselected number of increments, when pressure is applied to the setup piston. Total movement of the setup piston is in accordance with the particular hydraulically coupled control piston or pistons actuated.

The setup mechanism further includes a cyclically operated pressure supplying or setup valve. During one portion of the cycle the setup valve supplies liquid under pressure to the setup piston to axially shift the same, which in turn reacts through the hydraulic column to displace the control pistons the desired amount and thus limit the setup piston movement. At another portion of the cycle the setup valve is reversed and liquid under pressure is supplied to the opposite side of the previously displaced control pistons to return the same to their initial starting positions. This action, of course, results in a transfer of liquid in the connecting column in the opposite direction and returns the setup piston to its home position.

Another important feature is that liquid under pressure is periodically directed to the hydraulic column between the setup and control pistons at some point in the operating cycle which adds liquid to the column, if necessary, and thereby compensates for any leakage which may have occurred during the previous cycle. Thus a constant volume of liquid is maintained between the pistons to insure accurate operation.

In still another form, a plurality of setup valves have been provided which have been modified to be directly acted on by a related magnet. These valves are shifted in accordance with operation of the related magnets to transfer liquid under pressure from one side to the other of related control pistons to hydraulically shift the setup pistons the desired increments in a somewhat similar manner. In still other modifications the setup valves are actuated to permit control piston operation which in turn actuate the setup pistons the desired number of increments.

It is, therefore, another object of the invention to provide hydraulic control apparatus for a power transmitting piston which has its limit of travel predetermined.

It is still another object of the invention to preselect control setup means for a power transmitting piston which automatically limits piston travel to one of a plurality of positions.

It is yet another object of the invention to provide a variable preselecting control setup means for a power transmitting piston means both of which are automatically hydraulically returned to their initial starting positions at the end of each cycle of operation.

It is still another object of the invention to provide a hydraulically operated power piston and piston travel control means therefor operated by a hydraulic column which is periodically supplied with make-up liquid.

It is another object of the invention to provide a hydraulic piston for a power transmission and a control means therefor which involves relatively simple structure.

It is another object of the invention to provide a setup means for a wire printer which involves relatively few low inertia parts.

It is another object of the invention to provide a hydraulic code rod setup mechanism for a wire printer which is capable of high speed operation.

It is still another object of the invention to provide a hydraulic code rod setup mechanism for a wire printer which permits flexibility with respect to the location of the various control elements.

Other objects of the invention will be pointed out in the following description and claims and illustrated in the accompanying drawings, which disclose, by way of examples, the principle of the invention and the best mode, which has been contemplated, of applying that principle.

In the drawings:

FIGS. 1a and 1b, with FIG. 1b above FIG. 1a, is a partial vertical sectional schematic view of a wire printer with the improved hydraulically operated mechanism applied thereto.

Figure 4A:
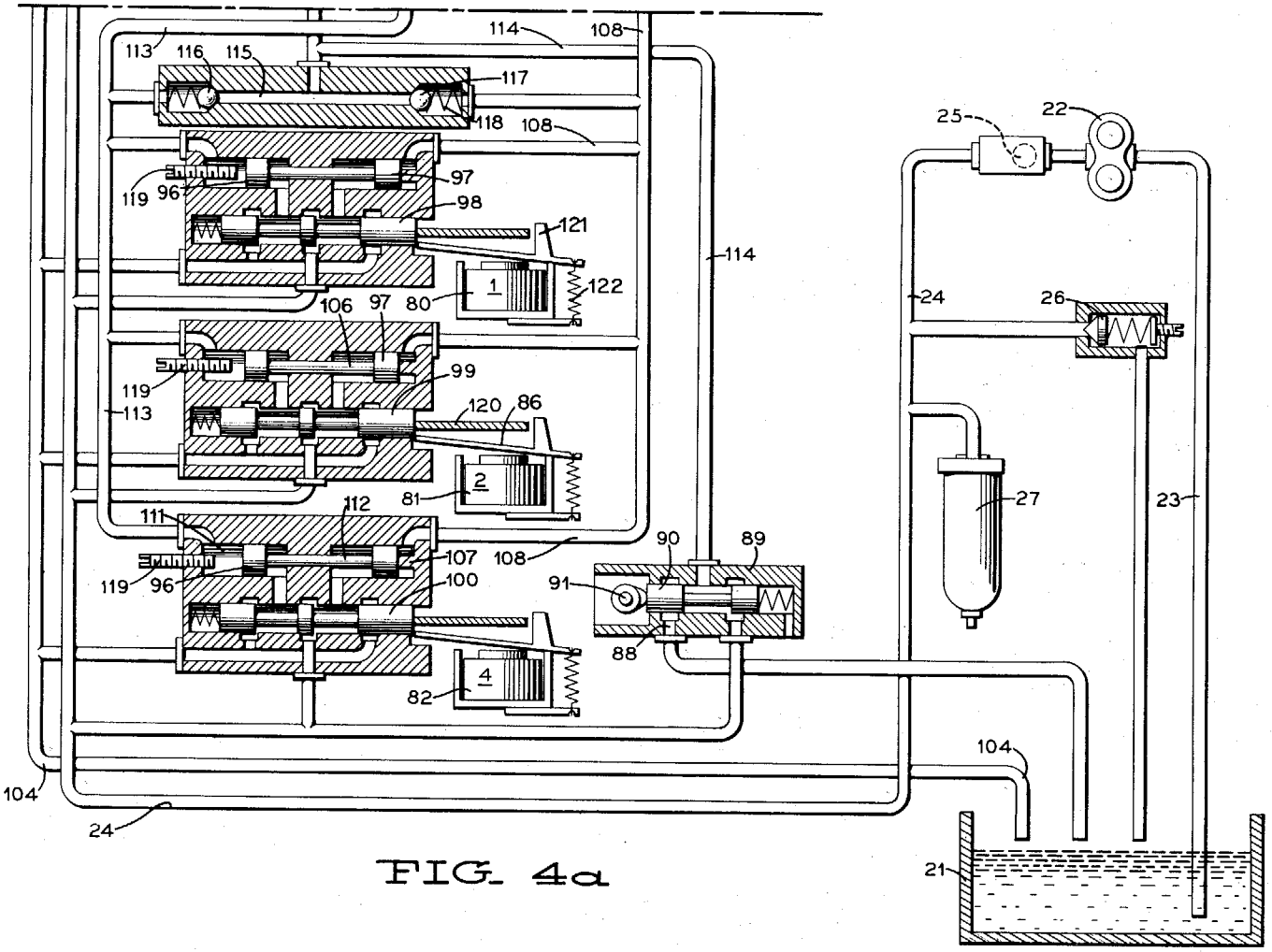

FIGS. 4a and 4b, with FIG. 4b above FIG. 4a, is a schematic vertical sectional view of a modified hydraulically operated setup mechanism.

Figure 5:
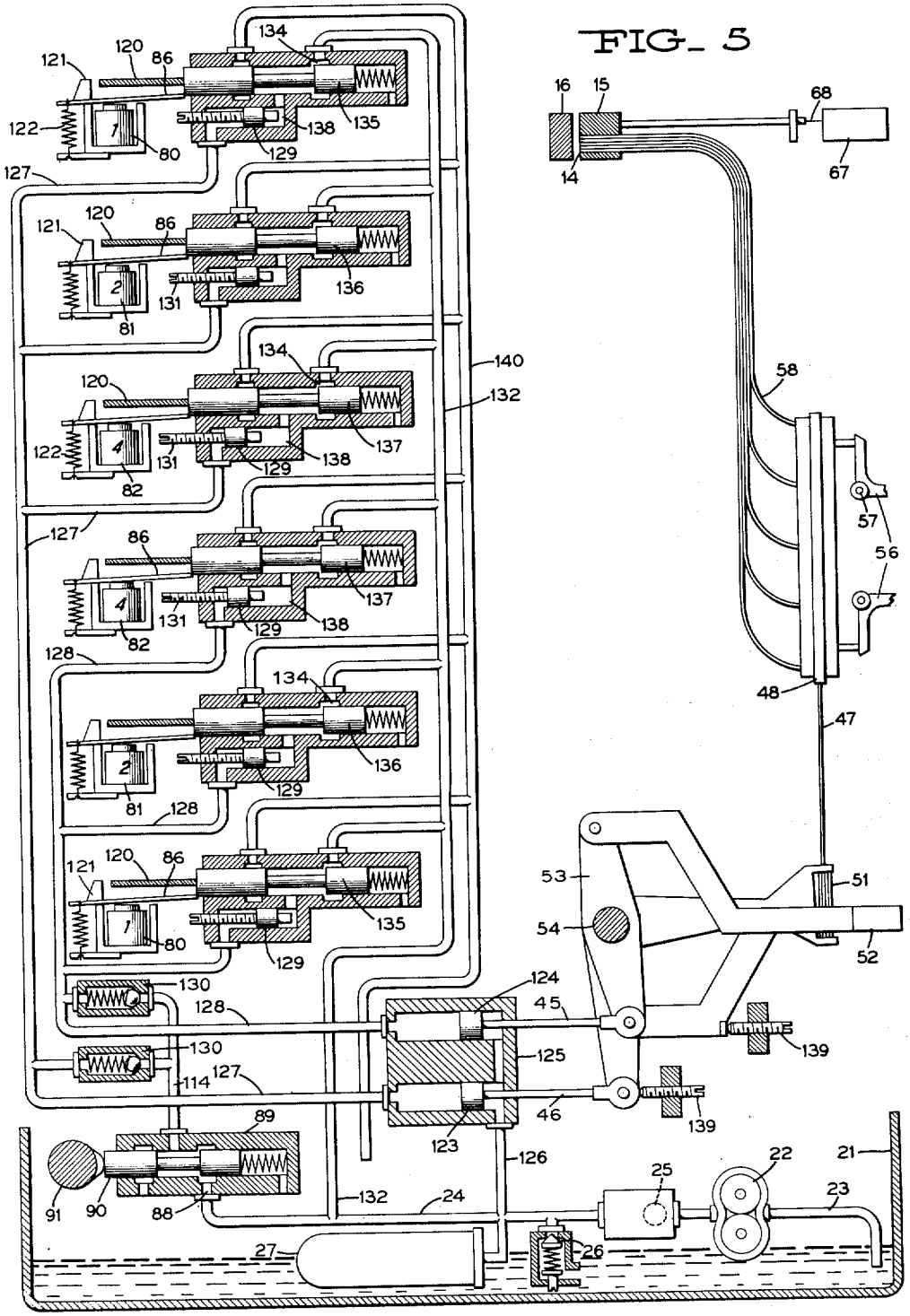
Figure 6:
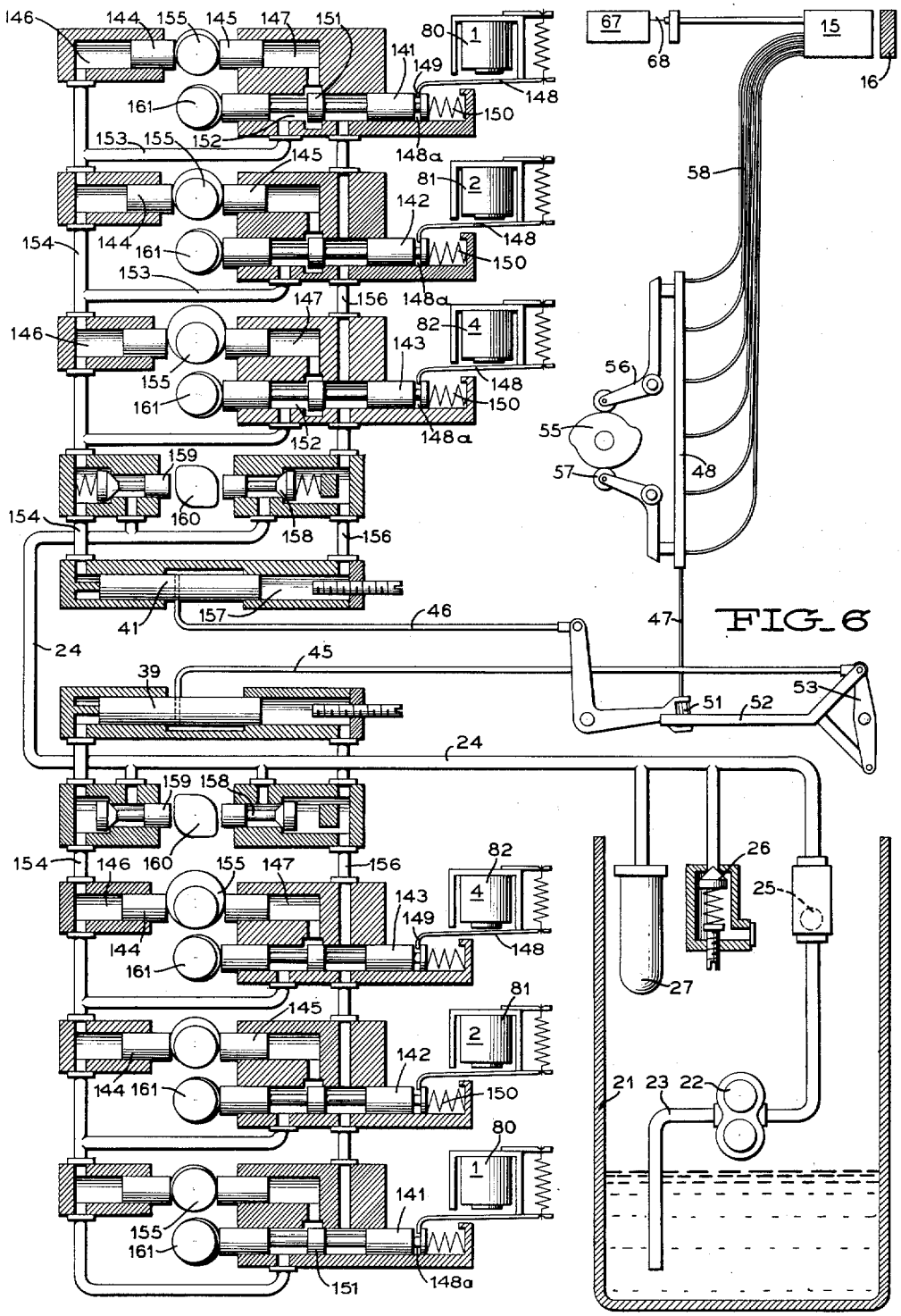

FIG. 5 is a schematic sectional view of still another modification of a hydraulically operated setup mechanism; and, FIG. 6 is a schematic sectional view of yet another modification of the improved hydraulically operated setup mechanism.

DETAIL DESCRIPTION

Figure 1A:
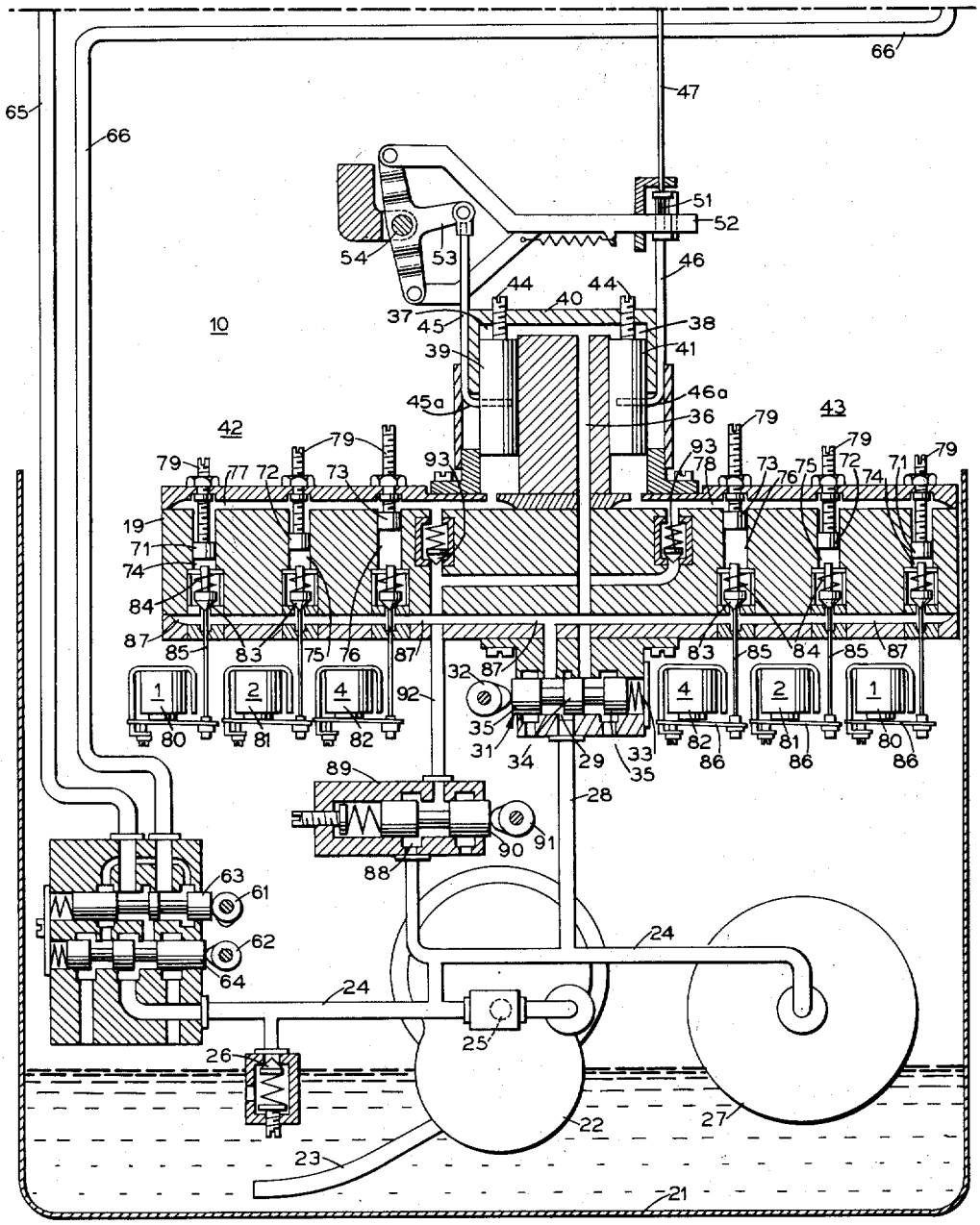
Figure 1B:
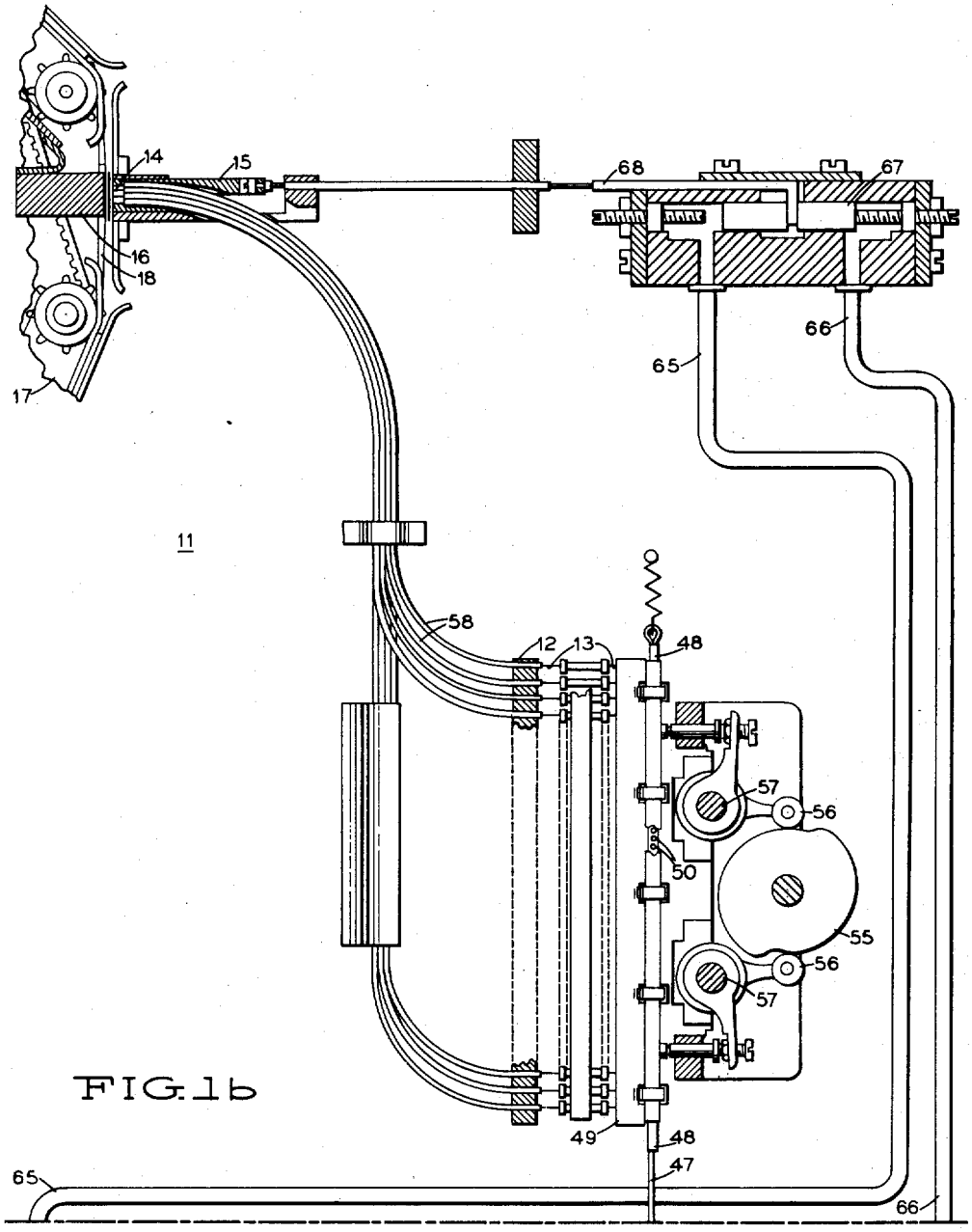

Referring now to the drawings for a detailed description of the improved hydraulically operated setup mechanisms, there is shown in FIGS. 1a and 1b a single ordered position of a preferred form of a hydraulically operated setup means 10, FIG. 1a, which is applied to a printing means or mechanism 11, FIG. 1b. This printing mechanism includes a suitable number of wire printer units 12 having an array of wires 13 arranged in a vertical row and whose upper ends 14, carried by a reciprocatable print head 15, face a suitable platen 16 mounted on a carriage 17. This carriage controls the movement of the paper 18 on which the selected data is to be printed. This printing mechanism may be of the type shown and described in Frank J. Furman et al. application, Serial No. 478,650, filed December 30, 1954. Since the particular means for receiving the data to be printed and the means for reciprocating and laterally actuating the print head 15 including the operation of the associated carriage 17 and the like form no part of this invention, only a general description will hereinafter be given.

Figure 2:
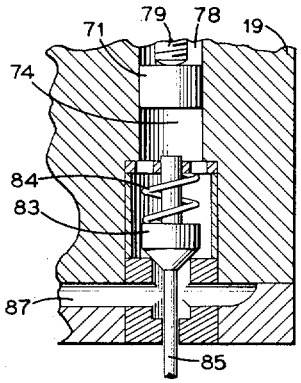
FIG. 2 is an enlarged vertical longitudinal sectional view of one of the control pistons and its related valve.

As shown in FIGS. 1a and 2, the hydraulically operated setup mechanism 10 includes a body member 19 in which is housed valve and piston mechanisms to be hereinafter described. This body member may be disposed within the confines of a suitable liquid retaining sump or reservoir 21 and the latter may be also adapted to accommodate a liquid pressure generating means in the form of a positive displacement gear pump or the like 22. The liquid in the reservoir 21 is withdrawn by the pump 22 through a suitable suction connection 23 and is delivered under pressure to a liquid pressure duct or conduit system 24. The system includes a check valve 25, to prevent back flow of pressure should the pump stop, and a liquid pressure relief valve 26 adapted to maintain a substantially constant liquid pressure therein. An accumulator 27 may also be connected to the duct system 24 to compensate for minor pressure fluctuations therein.

A branch conduit 28 in the pressure duct system 24 is directed to the pressure port 29 of a cyclically operated spool type setup valve 31. The valve is shifted or reciprocated by means of an eccentric 32 rotated in timed relation with other machine elements and performs one complete revolution for each print or setup cycle. The spool valve 31 is urged to follow the eccentric cam 32 by means of a suitable compression spring 33 associated therewith. The spool valve includes a central land 34, for directing the flow of high pressure liquid from the pressure port 29 to either the associated left or right-hand liquid conducting chambers, and a pair of outer spaced lands 35 for controlling the valve exhaust ports leading to the interior of the reservoir 21.

As shown, a passage or duct 36 extending from the right-hand chamber of the valve 31 is divided and directly communicates with a pair of cylindrical chambers 37 and 38, wherein reciprocatable driven or setup pistons 39 and 41, respectively, are mounted. In this instance, the chambers 37 and 38 are formed in a housing member 40 secured to the main body member 19. However, these members may be readily separated and disposed in different locations when design conditions dictate. Under such circumstances, the members would be hydraulically connected by means of suitable tubing and the like. It is to be noted both pistons 39 and 41 are adapted for simultaneous movement in the same direction upon the application of liquid under pressure to the passage 36, assuming the appropriate individual control means, 42 and 43, respectively, therefor have been previously actuated. In addition, each chamber is provided with an upper adjustable stop means 44 to limit upward travel of the setup pistons and represents the home or starting position of each piston.

The setup pistons 39 and 41 are provided with a related offset piston rod or drive wire 45 and 46, respectively, each of which has a lower inturned end 45a and 46a, respectively, secured adjacent the central portion of its related setup or driven piston. In this application, the right-hand drive wire 46 is directly secured by means of a connecting wire 47 to a code rod 48 slideably mounted on a laterally shiftable frame construction 49. This code rod is capable of longitudinal or axial shifting movement in direct proportion to movement of the related setup piston 41. Secured to the lower end of the connecting wire 47 is a single elongated gear 51 which meshes with a horizontal or laterally reciprocatable rack mechanism 52. Horizontal movement of the rack 52 results in rotation of the wire 47 and the code rod 48 about its longitudinal axis upon vertical movement of the left-hand setup piston 39. This motion translation may be accomplished in the standard manner wherein the rod 45 and rack 52 are secured to the ends of a crank arm unit 53 pivotal about an axis 54.

By selectively longitudinally shifting the code rod 48 to preselected increments, seven in the example shown, and selectively rotating the same about its longitudinal axis to one of five preselected positions, the various openings 50 in the code rod are capable of setting up any one of thirty-five different characters. As generally shown in FIG. 1b, the means for laterally shifting the code rod 48 includes a continuously rotating cam mechanism 55, which is adapted to oscillate crank arms 56 about a pair of parallel spaced axes 57. This provides a parallel lateral shifting movement to the frame 49 carrying the code rod 48. With the code rod 48 in any one of its thirty-five possible positions, when the code rod is shifted against the lower ends of the array of vertically aligned wires 13, certain of them are shifted axially through their respective guide casings 58. This action projects the forward ends of the actuated wires outwardly toward the platen 16. Under operating conditions, as soon as this takes place, the print head 15 is driven rapidly forward and the projecting ends of the wires print the character on the paper 18. This printing action returns the projecting wires to their normal positions and the print head 15 is retracted ready for the next cycle of operation.

The particular structural means for setting up these characters in the wire printer form no part of this invention, however, the above means are described in more detail in the above-mentioned Frank J. Furman application.

Any suitable means for driving the print head 15 may be provided, however, a hydraulic mechanism shown in FIGS. 1a and 1b is disclosed. As shown, a pair of synchronized eccentrics 61 and 62, provided with the proper phase angle difference, individually operate related print or control valves 63 and 64 in a predetermined manner to alternatively direct fluid supplied by the pressure system 24 through suitable conduits 65 and 66 to opposite sides of a print piston 67, FIG. 1b. This piston is connected to the print head 15 by means of a drive rod and wire assembly 68 to either hold the piston and print piston retracted, as shown, or to drive the same rapidly forward and perform the printing operation. This cyclic operation is timed in accordance with the setup means and other timed elements. The above hydraulic drive mechanism is fully described and claimed in Hugo A. Panissidi Patent 2,800,885, issued July 30, 1957. Since the particular print mechanism forms no part of the invention, a detailed description is not deemed necessary.

In order to accomplish the above-described printing operation, accurate movement of the setup pistons 39 and 41 must be provided to properly align the code rod for printing the desired character. In this modification, each setup piston control means 42 and 43 includes a set of three control pistons 71, 72 and 73, each of which is mounted for reciprocation in related control chambers 74, 75 and 76, respectively. As shown, one set of control pistons is connected hydraulically to the lower side of the left-hand setup piston chamber 37 by means of a liquid passage or channel 77 to provide a hydraulic or liquid transfer column, and the other set is hydraulically connected to the lower side of the right-hand setup piston chamber 38 by means of a similar passage to provide a hydraulic or liquid transfer column 78. Thus, it can be seen that each code rod 48 includes two setup pistons 39 and 41 and two sets of three control pistons 71, 72 and 73, which when actuated simultaneously or individually in a predetermined or preselected manner, permit code rod movement to print any one of thirty-five possible characters on the paper 18, FIG. 1b.

Since each code rod 48 for each ordered position is operated in an identical manner, only one of the print positions therefor will be described. Also, since the control means 42 and 43 for the rotational and the longitudinal movement of the code rod 48 are identical in construction and operation, only the longitudinal setup portion for the code rod setup will be described in detail. However, it is to be understood that the number of code rods 48 utilized depends upon the number of characters to be printed during a cycle of operation and that separate and independent rotational and longitudinal control means for each code rod is necessary.

As shown in FIGS. 1 and 2, the individual control pistons 71, 72 and 73 disposed in their separate chambers are each limited in upward travel by means of an adjustable abutment or stop 79. Each of the stops is adjusted to establish different starting or home positions for the associated control pistons to thereby provide different liquid storage capacities in the lower portions of the chambers. A feature of this control mechanism is that each control piston is assigned a weighted value in accordance with coded data which is translated into pulses and delivered to any one or any combination of three setup magnets 80, 81 and 82. These magnets and related control pistons may, in this instance, be labeled 1, 2 and 4, as indicated on each magnet, to provide a modified binary code handling mechanism capable of accepting and processing any combination of pulses to move the code rod 48 to any one of seven predetermined longitudinal positions.

As previously mentioned, with the abutments 79 for each control piston adjusted to different positions, the liquid receiving space or control chamber beneath each control piston has a different liquid capacity dependent upon the assigned weighted value. That is, the chamber 74 below piston 71 stores liquid equal to 1 increment of setup piston movement, chamber 75 stores liquid equal to 2 increments of movement and chamber 76 stores liquid equal to 4 increments of movement.

At the lower end of each control chamber is a valve means in the form of a poppet type control valve 83, having an upwardly projecting guiding stem, normally urged against its seat by spring means 84. Each valve normally seals its related chamber. Thus, it is obvious that when any of these poppet valves are closed, the trapped liquid in the associated chamber beneath each individual control piston will be effective to maintain the same against its related stop 79 during the hereinafter described setup operation for the associated piston 41. Projecting from the lower end of each poppet valve is a drive rod or wire 85 whose outer end is secured to the free end of a related armature 86 forming a part of the associated control magnet.

The liquid supplied to the lower portions of the control chambers is directed by the setup valve 31, when the spool therein has been shifted to the right by the eccentric 32, through a passage or channel 87. Opening the pressure port 29 in this direction directs high pressure liquid through the passage 87 to the bottom side of the poppet valves 83 and opens the same to supply liquid to any of the control chambers which may have been drained during a previous cycle, as will hereinafter be more fully described. During the interval when pressure is supplied to the lower ends of the poppet valves 83 to effect return operation of the control pistons, the passage 36 leading to the top surface of the setup pistons 39 and 41 is connected to drain at one of the exhaust lands 35 on the setup valve 31 to thereby permit return motion of the setup pistons. Likewise, when pressure is supplied through the passage 36 to drive the setup pistons 39 and 41, the passage 87 leading to the poppet valves 83 is opened to drain by the other exhaust land 35.

Liquid under pressure is not only continuously supplied to the setup valve 31, but also directed to the pressure port 88 of a supercharging or make-up pilot valve 89. This valve is provided with the usual reciprocatable spool 90 operated by a rotating eccentric 91 to control the supply of liquid to a divided passage or duct 92 terminating at a pair of spaced supercharge or make-up check valves 93. Each supercharge check valve is spring biased in opposition to the applied liquid and communicates directly with the related passages forming the hydraulic columns 77 and 78 between the lower portion of the setup piston chambers 37 and 38, respectively, and the upper surfaces of the associated control pistons. As shown, the hydraulic columns parallel connects the upper portions of the associated control pistons in the same manner as the passage 87 parallel connects the poppet valves 83. In order to time the application of liquid under pressure to the liquid columns 77 and 78, the supercharge valve 89 is reciprocated by the cam means 91 in timed relation with the other timed elements.

Figure 3:
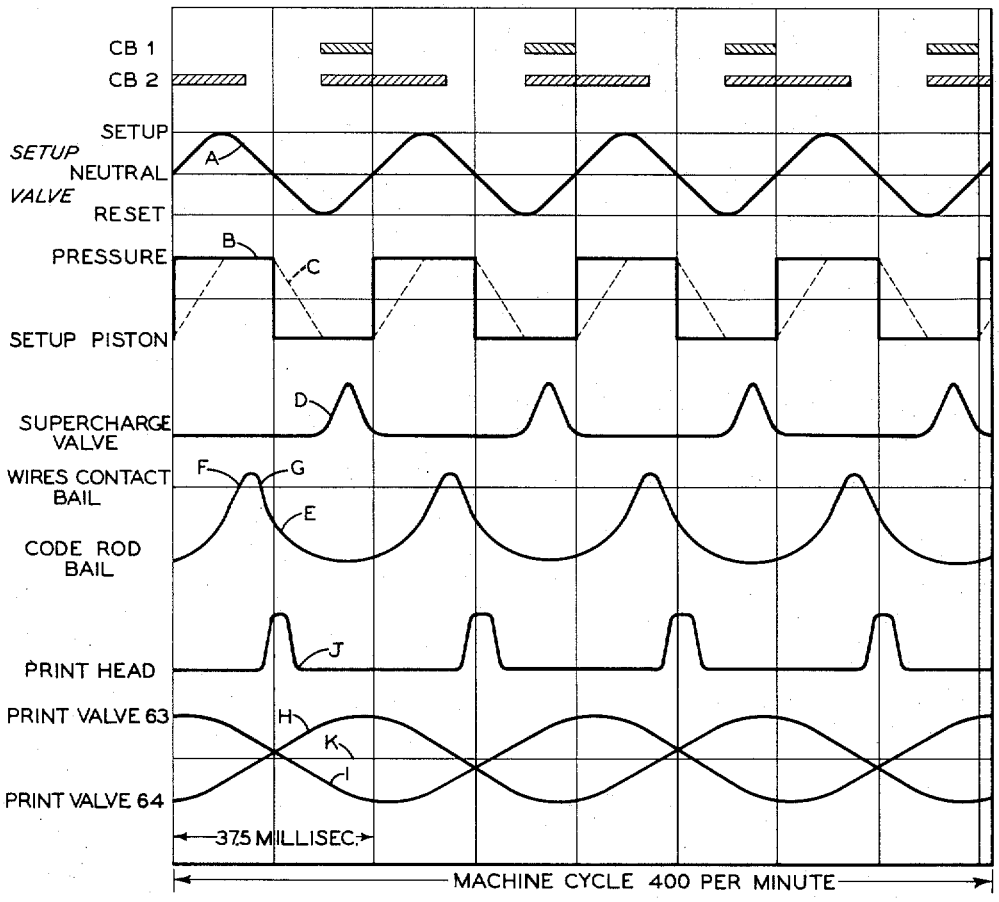
FIG. 3 is a timing chart for the improved apparatus showing the operation of the various elements at different portions of a printing cycle.

Referring now to FIG. 3, there is shown a timing chart of the various control or controlled elements which are necessary to properly synchronize the code rod setup mechanism and printing along with the machine operation. The setup valve 31 has a motion shown by the curve A and it passes in a cyclic manner from a neutral position to alternatively supply liquid under pressure to the setup pistons 39 and 41 and the poppet valves 83. The second curve B merely indicates the application of liquid under pressure from the setup valve 31 and includes the dotted line C to indicate setup piston motion with respect to time. As shown by the third curve D, the timing of the supercharging valve 89 is such that a liquid pressure pulse is directed over the passage 92 and is made available at the hydraulic columns 77 and 78 once for each code rod setup cycle. This preferably, though not necessarily, occurs at the time when the setup pistons 39 and 41 and the control pistons therefor are in their normal or home positions. As mentioned previously, this liquid pressure pulse causes the appropriate check valve 93 to open should any leakage have occurred from the columns during the previous cycle of operation and thereby insure a constant volume of liquid in the hydraulic columns 77 and 78 at all times.

The cam operated means, FIG. 1b, for the code rod 48 which is mounted on the frame 49, follows the cyclic curve E and provides a print wire setup between the points F and G during each cycle in timed relation with the setup and supercharge valve operation. Also, the lower two curves H and I show the operation of the print valves 63 and 64, respectively, which are adapted to move oppositely in a timed cyclic manner along with the setup valve 31. As shown in the curve J, at the point closely adjacent where the two valve motions cross the neutral line K, liquid under pressure is supplied to the right-hand side of the drive piston 67 to drive the print head 15 rapidly forward and then the liquid is reversed to retract the same to its normal position.

OPERATION

The cycle operation of the code rod setup mechanism is as follows: As shown in Figs. 1a and 1b, it is assumed the gear pump 22 is supplying liquid under pressure to the pressure conduit system 24. In addition, the cycle of operation is such that the setup pistons 39 and 41 and the control pistons 71, 72 and 73 are in their normal or home positions and that the supercharge valve 89 has just been actuated to supply liquid under pressure through the passage 92 to the hydraulic columns 77 and 78 to insure a constant volume of liquid therein. After this occurs, the rotating eccentric 91 automatically cuts off the supply of liquid and connects the supercharge passage 92 to drain.

Shortly after this hydraulic supercharge impulse, suitable electrical pulses are applied to any one or any combination of the setup magnets 80, 81 or 82, including both the rotational or longitudinal code rod controls, which pulsing, of course, is dependent upon the desired character to be printed. For the purposes of this description, it will be assumed the rotational setup magnets are not pulsed at this portion of the cycle and that only the magnet 80, associated with the longitudinal setup piston 41, is pulsed. This indicates one increment of code rod movement is desired.

As magnet 80 is pulsed, its related armature 86 is attracted and such action pushes against the drive rod 85 to open the associated poppet valve 83. Upon opening of this poppet valve, the liquid trapped in the chamber 74 is permitted to escape to the passage 87 which, at this instant in the cycle, is directed to drain through the left-hand exhaust port in the setup valve 31. The residual magnetism in the pulsed magnet 80 holds the related control poppet valve 83 open.

As the setup valve 31 shifts through its neutral position, liquid under pressure is directed over the passage 36 to the upper surfaces of the setup pistons 39 and 41. Since the rotational control poppet valves are closed, the setup piston 39 remains against its stop. However, this applied pressure acts to axially shift the longitudinal setup piston 41 downwardly, in this instance, due to the open condition of the poppet valve 83 associated with the control piston 71. This downward setup piston movement displaces a portion of the liquid in the lower portion of the chamber 38 which transfers through the liquid column 78. With no back pressure on the control piston 71, downward displacement takes place and forces the liquid thereunder into the now low pressure passage 87. This displacement continues until the piston 71 strikes the upwardly projecting stem on the related open poppet valve which reacts through the drive rod 85 to knock off the armature 86 of the magnet 80. Such action returns the poppet valve to its seat and stops or interrupts further movement of the control piston 71. As previously mentioned, the liquid capacity under this particular control piston is weighted to provide one increment of control piston movement. Thus the setup piston 41 is moved hydraulically one increment, which is a distance exactly equal to the displaced liquid in the chamber 74 below the control piston 71 and is then hydraulically arrested or stopped by the liquid column 78. This translation of the setup piston longitudinally moves the code rod 48 to a predetermined one increment position. After the above setup of the code rod takes place, it is laterally moved against the associated print wires 13 by the cam 55 to set up the desired character to be printed at the print head 15, after which the print piston 67 is actuated in the previously described manner to print the character on the paper 18 carried by the carriage 17.

It is to be noted that while the control pistons 72 and 73 in the chambers 75 and 76, respectively, were also acted upon by the pressure applied from the setup piston 41, they remain against their stops 79 and are not capable of movement. This is due to the liquid trapped in the control chambers 75 and 76 above their closed poppet valves.

After the code rod 48 is returned from contact with the print wires 13, the setup valve 31 is cammed in the opposite direction and the central land 34 therein redirects liquid under pressure through the passage 87 to the lower sides of the parallel connected poppet valves 83. At this time, passage 36 leading to the top side of the setup pistons 39 and 41 is connected to drain through the same valve. As liquid under pressure is applied to the poppet valves 83, the valves for the control chambers 75 and 76 will remain seated because the pressure therein is equal to the applied pressure. However, the increased pressure applied to the poppet valve for the control chamber 74 opens the same to replenish the previously discharged liquid. As the liquid flows through the now open poppet valve, the control piston 74 is displaced upwardly to its normal position against its stop 79. This return motion displaces the liquid above the piston 74 through the hydraulic column 78 which reacts on the lower side of the setup piston 41 to return the same to its normal or home position against the stop 44. When the supplied liquid completely fills the chamber 74, the pressure on both sides of the poppet valve equalizes, thus the normal spring-bias will close the valve and trap the liquid therein.

At the end of this control and setup piston return motion, the supercharge valve 89 is again momentarily opened to supply high pressure make-up liquid over the passage 92 to the liquid columns 77 and 78 to compensate for any leakage which may have occurred and thereby maintain a constant volume of liquid therein. In this manner it is always insured that the setup pistons are returned against their respective stops 44.

The code rod mechanism is now ready to receive its next instruction, which, when received, is carried out in an identical manner.

In this particular modification, the code rod setup mechanism is cyclically operated to set up a character to be printed every 37.5 milliseconds. Thus, this apparatus is capable of printing 400 characters per minute. These figures, of course, are given by way of example only because other suitable speeds, both higher and lower, may be established.

It is obvious that if all three magnets 80, 81 and 82 on the longitudinal setup piston side are pulsed simultaneously, all three poppet valves 83 are opened and the related control chambers 74, 75 and 76, respectively, are connected to drain. Thus, when liquid under pressure is applied to the upper surface of the setup piston 41, the same will be displaced a total of seven increments. After knock-off of the armatures and later in the cycle, all three poppet valves are opened by the application of liquid under pressure to the passage 87 to return all of the control pistons and thus the setup piston 41 a total of seven increments back to its normal home position. It is also obvious that by pulsing any combination of the three control magnets any desired incremental movement of the code rod may be realized. In addition, it should be clear that if incremental rotation of the code rod is desired, the rotational control magnets are pulsed in the same manner and the operation would be identical. It is to be understood, however, that more ro less than three control pistons may be employed. The number used would depend upon the desired piston movement.

MODIFICATIONS

Referring now to FIGS. 4a and 4b there is schematically shown a modified control means for both the lateral and rotational setup pistons 39 and 41 which are adapted to either laterally shift and/or rotate the code rod 48 in accordance with pulses delivered to the two sets of control magnets 80, 81 and 82. Since the setup pistons, control magnets and liquid supply systems are identical to the previously described modification, like elements are given like reference characters.

As in the first modification, each code rod 48 includes the pair of setup pistons. Each setup piston includes identical sets of control magnets and valve means operated thereby which are weighted to provide preselected incremental setup piston movement as previously described. In this construction, three pairs of oppositely disposed control pistons 96 and 97 are disposed in each increment control section, and control or setup spool type valves 98, 99 and 100 have been provided therefor, one for each pair of control pistons. Since each set of control means for both the longitudinal and the rotational movement of the code rod 48 are identical in construction and operation, only the longitudinal control means, shown in FIG. 4b, will be described.

In this construction, the liquid under pressure delivered by the gear pump 22 is applied through parallel passages or conduits 24 to the high pressure port 102 at each control or setup valve 96, 97 and 98. Each control valve includes the usual central control land 103 for directing the liquid delivered to the ports 102 and outer spaced lands for controlling flow through related drain ports which, in turn, are connected to a common drain passage 104. The spool of each setup valve is biased to the right, in this instance, by means of a compression spring 105 to normally abut the edge of the associated magnet armature 86.

As shown, the control magnets are all deenergized and the armatures 86 therefor are tilted upwardly to maintain their respective spools stationary and shifted to the left, so that liquid under pressure is directed to the right-hand chambers 106 defining cylinders in each of which is mounted one of the control pistons 97. This high pressure liquid holds the control pistons 97 against their associated stops or abutments 107. The opposite side of each control piston 97 is hydraulically connected by means of passages or ducts 108 to a chamber 109 at the right-hand side of the setup piston 41. The chamber 109 and the passages 108, together form a first hydraulic transfer column similar to the columns 77 and 78 in the previously described modification and acts to limit the setup piston movement in accordance with control piston movement.

With the spool valves shifted to the left, the left-hand chambers 111 housing the oppositely disposed individual control pistons 96 have their inner portions connected to the drain passage 104 by means of the exhaust ports. Since the inner surface of the left-hand control pistons 96 are subjected to low pressure, they are maintained shifted to the right against a slide or spacing bar 112 which maintains each pair of opposed control pistons 96 and 97 in equal spaced relation. The left-hand side of each left-hand control piston 96 is hydraulically parallel connected through a passage 113, which provides a second hydraulic column leading to the left-hand side of the setup piston 41. These control pistons 96 are maintained against the slide bars 112 by the pressure transmitted through the hydraulic column 113 when the setup piston 41 is moved to the left.

As in the previous modification, the supercharge make-up valve 89 is cyclically operated to periodically provide high pressure liquid over a conduit or duct 114 to branch passages 115, each of which has a pair of spaced spring-loaded make-up or supercharge check valves 116 and 117 therein. These check valves are disposed so that the discharge side of the right-hand check valves 117 are in communication with their respective hydraulic columns 108 and the left-hand check valves 116 communicate with their respective hydraulic columns 113. It is to be noted that while the application of liquid under pressure to the columns 108 and 113 occurs simultaneously, the right-hand check valve 117 is provided with a spring 118 having a lighter loading than that used on the left-hand valve 116. With this difference in spring loading, the right-hand valve 117 is afforded the opportunity to open first to apply the necessary make-up liquid to the column 108, should any leakage have taken place during the previous cycle of operation. Thus, this insures that the setup piston 41 is always urged to the left against its stop 44, defining its home position, and acts to hydraulically prevent piston movement to the right should the valve 116 be opened by the applied pressure to supply make-up liquid to the second column 113. Both driven or setup pistons 39 and 41 are shown in their normal or home positions.

Each control piston 96 is provided with an adjustable stop means 119. These adjustable stop members 119 are so arranged as to provide the 1, 2 or 4 incremental movement or combination thereof for the related setup piston in the same manner as described in the previous embodiment.

In order to actuate the setup valves 98, 99 and 100 to shift the code rod 48 the desired number of increments, a bail member 120 is associated with each valve, all of which are simultaneously reciprocated in timed sequence with the normal machine operation in any suitable manner (not shown).

OPERATION

In this particular construction, as the bails 120 move to the left and approach the end of their inward travel, they engage the associated control or spool valves to simultaneously shift the same slightly in the same direction to relieve the end thrust on the related latching armatures 86. This action occurs just prior to the delivery of a control impulse to the control magnets. Should, for example, the magnet 81 be energized at this time, calling for two increments of longitudinal setup piston and code rod movement, the related armature 86 is retracted in a downward direction so that it clears the outer edge of the control valve 99. Now as the bail motion reverses and moves to the right, the control valves 98 and 100 re-engage the armatures of the related unenergized magnets 80 and 82, respectively, however, the control valve 99 follows its bail under influence of the spring loading. As the central land 103 on the valve 99 crosses its pressure port 102, the application of liquid under pressure is directed from the right-hand chamber 106 to the left-hand chamber 111 and the outer lands cut off and open the left and right drain ports, respectively.

With liquid under pressure now acting against the inner surface of the left-hand control piston 96, the same shifts to the left until engaged by the associated stop 119 and displaces the liquid therein. This displaced liquid in turn reacting through the hydraulic column 113 displaces the setup piston 41 to the right an equal number of increments, two in the assumption given. Shifting of the setup piston 41, however, displaces a like amount of liquid in the right-hand portion of the chamber 109 through the first or right-hand column 108, which in turn reacts against the opposite righthand control piston 97 whose inner chamber 106 is now connected to drain. Thus, the related right-hand control piston 97 is shifted an equal number of increments and reacts on the slide bar 112 to aid in holding the left-hand piston 96 against its stop 119. At the end of the above-described motion, the code rod 48 has been automatically longitudinally shifted to the position for the desired character to be printed, after which the print wires 13 are set up in the standard manner by means of the rotating cam 55.

As the bail 120 continues to move to the right under the above-described conditions, its outer edge strikes the forward edge of an upwardly projecting arm 121 carried by the armature 86. This knocks off the attracted armature or armatures and a spring 122 associated therewith biases the now released armature in an upward direction to condition the same for control valve latching. Upon return movement of the bails 120, the released control valve 99 is shifted to the left, which in turn transfers the application of liquid under pressure from the port 102 to the right-hand chamber 106. This liquid transfer again shifts the control piston 97 to the right against the related stop 107 and displaces liquid through the first hydraulic column 108 to return the setup piston 41 to home position against its stop 44. Such setup piston movement in turn reacts through the other or second hydraulic column 113 to also return the left hand control piston 97 to its normal or initial position. As the bail pushes the control valve 99 past the forward edge of the related armature 86, the latter snaps upwardly and locks the valve in position. This control valve will remain latched until the related magnet is again pulsed from the control source, regardless of the succeeding reciprocating bail movements.

Here again, it is obvious that the setup piston 41 may be moved any number of increments from 1 to 7 by selectively energizing any one or any combination of the three control magnets 80, 81 and 82 and that the operation in each instance would be identical. The same would also apply to operation of the setup piston 39. After return of the setup and control pistons, liquid under pressure is supplied to both hydraulic columns 108 and 113, in the previously-described manner, to maintain the setup piston 3 against its stop.

FIG. 5 schematically represents still another means for hydraulically setting up the code rod 48 in which the operation of a pair of setup pistons 123 and 124, mounted in a stationary body member 125, have been modified slightly and a slightly different control valve and setup piston means have been provided.

In this construction, the liquid under pressure is continuously supplied by means of a conduit 126 to the right-hand side of both setup pistons 123 and 124 to continuously bias the same to the left. This biasing force of each piston reacts through passages defining hydraulic columns 127 and 128, each of which is parallel connected to the left side of separate groups of three control pistons 129. Each control piston 129 is provided with an adjustable abutment or stop member 131.

A branch passage 132 conducts liquid under pressure to parallel conduits leading to the pressure ports 134 of the two groups of three setup or control valves 135, 136 and 137. One group of valves controls the rotational and the other controls longitudinal movement of the code rod 48 through suitable linkage. Since each code rod 48 involves two identical control portions and valve control means therefor, only one will be described.

The setup valves 135, 136 and 137 are each maintained latched to the right, as shown, by an armature 86 and magnet construction identical to that described in FIG. 4 and includes an identical reciprocatable bail means 120. With the control or setup valves shifted and latched to the right by the armatures 86, it can be seen the liquid under pressure is supplied from the individual pressure ports 134 to the right-hand side of an associated control piston chamber 138 to maintain the related control piston 129 therein against its adjustable stop 131. Here again, the position of the stops 131 and movement of the control pistons 129 determines the increment of movement of the driven or setup piston 124.

With the mechanism as shown, the make-up or supercharge valve 89 cyclically supplies liquid under pressure over the conduit 114 to the make-up check valves 130 associated with their respective hydraulic columns 127 and 128 at predetermined timed intervals during each printing cycle to insure a constant volume of liquid therein and thereby provide for proper setup piston displacement at all times. Also, in this instance, the unbalanced condition of the opposite sides of the setup pistons 123 and 124, due to the piston rods 45 and 46, results in a pressure differential to the right to always return the setup pistons 123 and 124, respectively, to normal or home position against the stationary stops 139. The control pistons 129 are urged against their respective stops 131 by the liquid under pressure supplied over the line 132.

Now assuming that the reciprocating bails 120 are moved to the right to relieve the latching pressure on the related armatures 86 and any one or all of the control magnets are pulsed, the related armatures of the pulsed magnets are attracted. As the bails 120 return or move to the left and the control valves of the related pulsed magnets follow such movement, the applied high pressure liquid to the right-hand side of the effected control pistons 129 is cut off and the related chambers 138 are connected through the drain ports in the valves to a suitable drain passage 140. As the drain ports open, the liquid under pressure which is continuously acting on the right side of setup piston 123, shifts the same to the left and hydraulically displaces the effected control pistons 129 to the right. This shifting movement of the control pistons 129 continues until they strike the end of their related chambers 138 to thus hydraulically limit the extent of setup piston movement.

At this point, the setup piston 123 will have moved the desired number of increments to provide the proper positioning of the code rod 48 for the character selected, after which the wire setup and printing operation occur in the usual manner. The return movement of the bails 120 shifts the released control valves to the right to relatch the same with the related armature 86 and redirect liquid under pressure to the right-hand side of the control pistons 129, which in turn are displaced to the left against their related stops 131. This motion, of course, reacts through the hydraulic column 127 to return the setup piston 123 to its normal or home position against the stop 139, in opposition to the constant liquid pressure acting in the opposite direction. This cycle of operation would be repeated in timed relation with other required elements in the printing operation, which includes, of course, the cyclic application of high pressure liquid to the hydraulic columns through the check valves 130.

Referring now to FIG 6, there is schematically disclosed still another modified code rod setup mechanism for the code rod 48. In this construction each setup piston 39 and 41 in turn includes three individual control or setup valves 141, 142 and 143, each of which is associated with related pairs of oppositely disposed reciprocatable control pistons 144 and 145 mounted in separate chambers 146 and 147, respectively. As in the previous modifications, since each setup piston includes identical elements, only the longitudinal setup control means will be described. Each control magnet 80, 81 and 82 includes an armature 148 with a downturned latch member 149 thereon adapted to engage in a slot 148a formed within the periphery of its related control valve and an associated spring 150 is adapted to normally urge the valve to the left. Under normal de-energized magnet conditions, the valves are all held to the right, as shown, and in this condition the central land 151 of each maintains its central control port open to the left-hand liquid chamber 152. This left-hand chamber in each directly communicates with a conduit or passage 153 hydraulically connected in parallel to similar passages by means of a first liquid passage or channel 154. The passage 154 also parallel connects the chambers 146 for the left-hand control pistons 144 to the left-hand side of the setup piston 41 to provide a first hydraulic column.

In the position shown and with a constant volume of liquid in the hydraulic column under a suitable pressure, each pair of oppositely disposed control pistons 144 and 145 are hydraulically urged against a related common eccentric 155. These eccentrics are each designed to provide for different control piston displacements, however, they are synchronized to rotate in unison and in phase so that all control pistons simultaneously move in the same direction. With all of the control valves in the position shown, it can be seen the opposite control piston chambers 146 and 147 are in effect short-circuited, through the passage 153, that is, as the eccentrics 155 rotate, liquid is displaced from the control piston chambers at one side to the other through the central ports of the control valves. Since this represents a net zero displacement, the result is that the setup piston 41 is not effected. In addition, the setup piston is maintained in its normal or home position by the trapped liquid in a second hydraulic column 156 communicating with the chamber 157 at the right side of the setup piston 41. Thus, during this interval, the central lands 151 of the control valves block setup piston movement.

At a predetermined point in the printer cycle, supercharge or make-up liquid poppet valves 158 and 159 are sequentially cammed open by means of a double lobed cam 160 and liquid under pressure is supplied to both hydraulic columns 154 and 156, to insure a constant volume of liquid in both. The phase angle difference of the lobes on the cam 160 is such as to apply the high pressure liquid pulse to the column 156 prior to the column 154. This insures the return of the setup piston 41 against its stop and acts as a buffer to prevent the piston from taking some intermediate position, should the pulses be applied simultaneously to each column. In the foregoing, the mechanically operated eccentrics and the like are rotated in synchronism in timed relation to the machine cycle operation in any suitable manner, not shown.

Now if one or more of the control magnets 80, 81 or 82 are energized, during the proper portion of the printing cycle, the related armatures 148 are retracted from engagement with its associated setup valves, which are urged to the left against a related continuously rotating control valve eccentric 161. These eccentrics are rotated in synchronism with the control piston eccentrics 155, which, in turn, are continuously reciprocating their related pairs of control pistons 144 and 145.

For purposes of the description, it will be assumed magnets 80 and 81 are energized and magnet 82 remains normal. When energization occurs, the central lands 151 controlling the central ports of the valves 141 and 142 transfer and the valve 143 remains normal. The timing of the control pulses are such as to take place when the left-hand control pistons 144 are retracted or at the low point on the eccentrics and the right-hand control pistons 145 are at maximum displacement riding on the high portion of the same eccentrics, and the valve operating eccentrics 161 are moving away from their control valves. With continued valve eccentric movement, communication between the right-hand control piston chamber 147 and the hydraulic column 154 is cut off. At the same time the cutoff chambers 147 are connected to the hydraulic column 156 through the same central port. Now as the eccentrics 155 continue to rotate, the displaced liquid in the left-hand control piston chamber under the control of the valve 143 transfers to the related right-hand chamber 147 in the usual manner. However, the displaced liquid in the other two left-hand chambers 146 can not transfer in this manner due to the cutoff position of the valves 141 and 142. Therefore, this displaced liquid transfers over the hydraulic column 154 to the setup piston chamber and shifts the setup piston 41 to the right a total of three increments. This movement is determined by the total displacement of the two control pistons, which as shown, are operated by eccentrics 155 having different throws.

As the setup piston 41 shifts to its new position, a like quantity of liquid to the right is displaced through the hydraulic column 156 and now opened central control ports of the valves 141 and 142 to the now expanding control piston chambers 147. This influx of liquid causes the right-hand pistons 145 to follow their related eccentrics 155, which action, of course, provides the proper space for displaced liquid.

When the eccentrics 155 have displaced the related control pistons a maximum to the left, the code rod has been shifted longitudinally to the desired position, to permit setup of the wires in the matrix for printing the desired character. The timing of the eccentrics 155 are such that after print wire setup has occurred, the rotating eccentrics now reverse the direction of control piston movement. Thus the reverse action takes place, that is, as the right-hand control pistons 145 begin shifting to the right, the liquid in the chambers 147 is transferred through the hydraulic column 156 to return the setup piston 41 to its home position. This action, of course, returns the previously transferred liquid back to the left-hand control chambers 146. By the time this point in the cycle is reached, the valve cams 161 will be in a position to shift the control valves 141 and 142 to latch position and the control ports are again disposed in the original liquid short-circuiting position. The make-up liquid is supplied to the columns 156 and 154, respectively, as previously described.

This represents a complete cycle of operation and any further control pulses are handled in a like manner to either longitudinally shift and/or rotate the code rod 48 to any desired position.

From the foregoing, it can be seen that a hydraulic control means for accurately positioning a code rod or the like has been provided, which involves relatively low inertia elements capable of rapid movement to provide the desired increment of movement of the code rod or output member. Also, that a hydraulic operating means for a code rod or the like has been provided which is supplied with liquid under pressure at some predetermined point in each cycle of operation to maintain constant volumes of liquid in the hydraulic operating means to thereby insure accurate movements of the driven members.

With constructions of the types described, very high speed operation of driven members may be realized which exceeds that provided by conventional electromechanical operating mechanisms.

While the above description of the hydraulic control mechanisms have been specifically applied to the operation of a code rod for a wire printer, it is to be understood this control would be equally applicable to other mechanisms wherein it is desired to selectively shift a driven member to one of a plurality of predetermined positions.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

*As used in certain of the claims, the terms "input" and "inlet" refer to a column or pipe, such as 128, containing*

*fluid under pressure but not necessarily connected directly with a source, like 22; as illustrated, column 128 is connected indirectly with the source via set-up piston 124. "Output" and "outlet" connote a conduit or passage, such as 140, for receiving pressure fluid to permit or cause performance of a desired work operation. "Parallel flow paths" connotes paths which extend in parallel from the "inlet" toward the "outlet," as above defined, though not necessarily having a fluid communication with the "outlet." The term "successive digital orders" refers to a series of interrelated binarily weighted code sequencies.*

What is claimed is:

1. In cyclically operated hydraulic control apparatus, the combination of a driven piston having an initial starting position and whose limit of movement therefrom is to be selectively controlled to one of a plurality of positions, a control assembly including control pistons for providing the preselected limits of driven piston travel, means including a hydraulic column for connecting said control pistons to said driven piston, cyclically operated means for hydraulically shifting said driven piston to one of the plurality of positions and for hydraulically returning the same to its initial starting position through said hydraulic column, means for holding said driven piston stationary during cyclical operation of said last-named means, and valve means for periodically supplying liquid under pressure to said hydraulic column to maintain a constant volume of liquid between said control and driven pistons.

2. In cyclically operated hydraulic control apparatus, the combination of a cyclically operated controlled piston having an initial starting position and whose limit of movement therefrom is to be selectively controlled to one of a plurality of positions, a control assembly for said controlled piston providing for the preselected limits of controlled piston travel during a cycle of operation, said control assembly including a plurality of displaceable control pistons, means for providing a hydraulic column between said control pistons and said controlled piston to directly limit the extent of movement of said controlled piston, locking means for maintaining said control pistons inactive during cyclical operations to thereby hold said controlled piston stationary through said hydraulic column, means associated with said last-named means for selectively activating one or more of said control pistons to permit the displacement of liquid in said hydraulic column, the displacement of said controlled piston corresponding to the total displacement of the active control pistons, and cyclically operated means for returning the activated control pistons and said controlled piston to their initial starting positions, said locking means being operative with the control pistons to hold said controlled piston through said hydraulic column.

3. The combination as claimed in claim 2 including means for applying liquid under pressure to said hydraulic column to maintain a constant volume of liquid therein and insure the return of said controlled piston to its starting position.

4. The combination as claimed in claim 3 including means for timing the application of the liquid under pressure to said hydraulic column to occur after said controlled and control pistons have been returned to their starting positions.

5. A cyclically operated hydraulic setup mechanism for selectively rotating and longitudinally translating a code rod for a wire printer to one of a plurality of positions, comprising a pair of drive pistons having starting positions and operatively connected to said code rod for selectively longitudinally translating and rotating the same in accordance with the desired character to be printed during a cycle of operation, an independently operable control assembly for each drive piston, each control assembly being cyclically operable and including a plurality of independently displaceable control pistons defining a group, a passage providing a hydraulic column between each group of control pistons and the associated drive piston to provide for simultaneous movement therebetween, locking means associated with each control piston to selectively hold said drive piston during a cyclic operation, means for selectively operating said control assembly to permit one or more of said control pistons to permit hydraulic movement of the associated drive piston to the extent permitted by the displacement of the selectively operated control pistons, cyclically operated means for hydraulically returning the selectively operated control piston and the actuated drive piston to their initial positions, and cyclically operated means for maintaining a substantially constant volume of liquid in said hydraulic columns.

6. In cyclically operated hydraulic control apparatus, the combination of a cylinder having a driven piston therein normally disposed at a starting position, a control piston hydraulically movable from first to second positions, a passage providing a liquid pressure transfer column between said driven and control pistons to provide for simultaneous movement, valve means for hydraulically holding said control piston in the first position, means for selectively conditioning said control piston displacement means for operating said valve means to permit movement of said control piston, and cyclically operated valve means operative to alternately supply liquid under pressure to said driven piston to shift the same and said control piston through said liquid pressure transfer column an amount determined by the resultant control piston movement to its second position and to return said driven piston to its starting position by applying liquid under pressure to said control piston to return the same to its first position, said valve means being operative after return of said control piston to hold said driven piston stationary during continuous operation of said cyclically operated valve means.

7. In a cyclically operated hydraulic control system, the combination of a cylinder having a drive piston therein normally disposed at a starting position and cyclically movable to one of a preselected number of positions, control means including a plurality of control pistons each having a starting position, means including a hydraulic column for connecting one side of said control pistons to one side of said drive piston for movement therewith at preselected intervals, independent valve means normally set to hold each control piston in the starting position during cyclic operation of the system, said control pistons being operative through said hydraulic column to hold said drive piston stationary when at their starting positions, means for individually and selectively operating one or more independent valve means to condition the related control pistons for operation, cyclically operated means for applying pressure to said drive piston, to move the same a distance determined by hydraulic movement of the selectively conditioned control pistons, means for reversing the application of pressure to return said drive and control pistons to their starting positions and means for resetting the selectively operated valve means to hold said control and drive pistons at the starting positions.

8. In a hydraulic control system, the combination of a cylinder having a drive piston therein normally disposed at a starting position and movable to one of a preselected number of positions, a plurality of control pistons each mounted in an individual control chamber and having a starting position, means including a hydraulic column for connecting one side of said control pistons to one side of said drive piston for movement therewith at preselected intervals, control valve means associated with each chamber, said control valve means, when closed, being effective to hydraulically hold said drive and control pistons stationary, means for individually and selectively opening one or more of said control valves to permit liquid flow from the related control chamber, means for applying pressure to said drive piston to displace the same and the control pistons through said hydraulic column whose related control valves have been opened, said actuated control pistons being operative upon predetermined displacement to close the associated valve and interrupt further drive piston movement, and means for reversing the application of liquid under pressure to reopen the related control valves of the actuated control pistons to apply pressure thereto, the actuated control pistons being returned to their starting positions and hydraulically returning said drive piston through transfer of liquid in the actuated liquid column, said control valves being returned to cutoff position after said control pistons have been returned to trap the liquid in said control chambers and prevent further movement of the related control piston.

9. In a hydraulic control system, the combination of a driving piston normally maintained at a starting position within a chamber and hydraulically movable to any one of a predetermined number of increments, a plurality of control pistons, each disposed in an individual control chamber and adapted to be independently movable therein, means including a hydraulic column for hydraulically parallel connecting one side of said control pistons to one side of said driving piston, individual valve means for each control chamber to trap liquid therein and block control piston movement, means for normally maintaining said valve means closed, means for selectively opening one or more of said valves in accordance with predetermined desired increments of driving piston movement, and means for applying liquid under pressure to the opposite side of said driving piston to displace the same and to hydraulically displace through said hydraulic column the control piston whose valve means were opened, said displaced control pistons being operative after preselected driving piston travel to engage and close the associated valve and react through said hydraulic column to interrupt further travel of said driving piston, said last-named means being effective after the driving piston travel has been interrupted to apply liquid under pressure to said control valve means to open the same and apply liquid under pressure to said evacuated control chambers to return the displaced control pistons and hydraulically return said driving piston to its starting position.

10. The combination as claimed in claim 9 including means for periodically applying liquid under pressure to said hydraulic column after said driving piston has been returned to its starting position to maintain a constant volume of liquid therein.

11. In hydraulic control apparatus, the combination of a setup piston disposed in a chamber at a normal starting position and movable to one of a predetermined number of positions, a plurality of control pistons, a passage providing a liquid column for hydraulically connecting one side of said control pistons to one side of said setup piston, an individual liquid control chamber associated with the opposite side of each of said control pistons, said control chambers each being of a different capacity, a control piston valve disposed at the opposite side of said control chambers to seal the same, a magnet including an armature connected to a related control valve, a setup valve having pressure and exhaust ports, passages extending from opposite sides of said pressure port for alternatively connecting the other side of said setup piston and said control valves to liquid under pressure and to drain, said control valves being selectively opened upon energization of the associated magnet to direct the liquid in the related control chambers to drain, means for operating said setup valve in timed sequence whereby after the desired control valves have been opened liquid under pressure is applied to said setup piston to move the same and transfer liquid in said hydraulic column to displace the control pistons whose related control valves have been actuated, said control pistons being operative to engage their related actuated valves to close the same and seal the related control chamber to prevent further movement of said setup piston, said setup valve being operative upon a reversal of movement by said operating means to apply pressure to said control valves to reopen those closed by said control pistons and resupply liquid to the related control chambers and return the actuated control pistons to their starting positions, said return movement of said control pistons reacting through said column to return said setup piston to its starting position, and a valve operative after the setup and control pistons have returned to their normal starting positions to supply liquid to said hydraulic column to maintain a constant volume therein.

12. In a cyclically operated hydraulic control system, the combination of a driving piston having an initial position and whose limit of travel is to be selectively controlled, a control piston having a predetermined limit of travel, a liquid passage providing a hydraulic transfer column connecting said driving and control pistons for providing simultaneous movement therebetween, valve means for hydraulically holding said control piston stationary during cyclic operating of the system, means for selectively operating said valve means to condition said control piston for displacement, cyclically operated means for applying pressure to said driving piston to displace the same and said control piston through said hydraulic column, said control piston movement limiting said driving piston travel, said cyclically operated means being further operative through said valve means to apply liquid under pressure to said control piston to return the same and to hydraulically return said driving piston to its initial position, and means for maintaining a constant volume of liquid in said connecting passage.

13. In a cyclically operated hydraulic control system, the combination of a driving member normally maintained at a starting position and hydraulically shiftable to one of a plurality of positions, a control piston having a predetermined limit of travel, a passage providing a hydraulic column directly connecting said driving member and control piston for movement in unison, control valve means having a normal position for maintaining said control piston in its starting position to hold said driving member stationary, means for operating said control valve means to condition said control piston for movement, cyclically operated means for applying pressure to one side of said driving member to displace the same an amount equal to the limit of travel of said control piston, said cyclically operated means being operative to transfer the application of pressure to said control piston to return the same and said driving member to their starting positions, means for returning the operated control valve means to the normal position at the end of each operation and means for periodically supplying liquid under pressure to said hydraulic column to maintain a constant volume of liquid therein.

14. In cyclically operated hydraulic control apparatus, the combination of a controlled piston whose limit of movement is to be controlled, a control piston assembly having a preselected limit of travel, means for hydraulically connecting said pistons for simultaneous movement, a control valve for normally holding said pistons stationary during cyclic operation, means for operating said valve to direct liquid under pressure to said control piston assembly to shift the same the preselected limit of travel and hydraulically displace said controlled piston through the hydraulic connection, cyclically operated valve means for hydraulically returning said controlled piston to its starting position by redirecting the application of liquid under pressure to said control piston assembly, means for actuating said control valve to the normal holding position at the end of each cycle of operation, and means for applying liquid under pressure to said hydraulic connecting means to maintain a constant volume of liquid therebetween.

15. In hydraulic control apparatus, the combination of a setup piston selectively reciprocated within a chamber between a starting position and one of a plurality of forward positions, a plurality of first and second pairs of reciprocatable control pistons, means for holding each pair of pistons in spaced relation, separate passages providing first and second liquid columns extending from opposite faces of said setup piston to opposite faces of each pair of control pistons, a control valve for each pair of control pistons, means for holding said control valves in the first position to direct liquid under pressure to one of each pair of said control pistons to hydraulically maintain said setup piston in its starting position through said first liquid column, means for operating said control valve to redirect the fluid under pressure to the associated second control piston, said second control piston acting through said second liquid column to hydraulically shift said setup piston an equal number of increments, said setup piston displacing liquid on the opposite side thereof through said first column to the first control piston to compensate for the liquid displacement, and means for returning said control valve to said one position to reapply the liquid under pressure to said first control piston to return said setup piston to its starting position through said first column.

16. In a hydraulic control system, the combination of a chamber having a hydraulically operated driving piston therein and having a normal starting position, control means for selectively positioning said driving piston to one of a predetermined number of positions, said control means including a plurality of pairs of spaced first and second control pistons, means for limiting the movement of said control pistons, means for hydraulically parallel connecting one side of said first pistons of each pair to one side of said driving piston to provide a first hydraulic column, means for hydraulically parallel connecting one side of said second pistons of each pair to the opposite face of said driving piston to provide a second hydraulic column, a control valve for each pair of control pistons, means for normally holding each of said control valves in one position to direct liquid under pressure to one side of each of said first control pistons to hydraulically hold the same and said driving piston stationary, means for selectively operating one or more of said control valves to redirect the liquid under pressure to said second control pistons of the actuated valves to hydraulically displace the related second control pistons a predetermined number of increments and hydraulically shift said driving piston through said second column an amount equal to the total control piston displacement, said driving piston being operative to hydraulically shift the associated first control pistons of the operated valves in the direction of the actuated second control pistons through said first hydraulic column, means for returning the operated valve or valves to their original positions to reverse the application of liquid under pressure from said second to said first control pistons to return the same, said first control piston movement acting through said first hydraulic column to return said driving piston to the starting position, said actuated second control pistons being hydraulically returned to normal by transfer of liquid through said second hydraulic column, and means for periodically applying liquid under pressure to said first and second hydraulic columns to maintain a constant volume of liquid therein, said last-named means including means operative to supply liquid to said first hydraulic column prior to said second hydraulic column to maintain a pressure bias on said driving piston in the direction of said normal starting position.

17. In hydraulic control apparatus, the combination of a setup piston normally disposed within a chamber at a starting position and reciprocatable therein to one of a plurality of other positions, a source of liquid under pressure, means for continuously supplying liquid to one side of said setup piston to urge the same in one direction, a control piston movable a preselected number of increments, a hydraulic column for connecting said control and setup pistons for simultaneous movement, a control valve means for maintaining said control valve in one position to direct liquid under pressure to one side of said control piston in opposition to the pressure supplied to said one side of said setup piston, means for operating said valve to connect said one side of said control piston to drain whereby the liquid under pressure acting on said one side of said setup piston shifts the same and acts through said hydraulic column to shift said control piston the predetermined number of increments, cyclically operated means for returning said control valve to said one position to reapply liquid under pressure to said control piston to return the same, said control piston acting through said column to return said hydraulic setup piston to its starting position, and means for applying high pressure liquid to said hydraulic column at a predetermined point in the cycle of operation to maintain a constant volume of liquid in said hydraulic column.

18. In hydraulic control apparatus, the combination of a setup piston normally disposed in a chamber at a starting position and movable therein to one of a plurality of preselected positions, a plurality of pairs of oppositely disposed control pistons each mounted in a control chamber, means defining first and second hydraulic column for hydraulically connecting one side of each pair of said control pistons to opposite sides of said setup piston, control piston cycling means for displacing said pairs of control pistons in synchronism to displace liquid in said control chambers, a control valve associated with each pair of related control chambers, means for reciprocating said control valves in synchronism with said control piston cycling means, latch means for holding said control valves out of engagement with said reciprocating means to provide continuous transfer of liquid between opposite control chambers of related pairs of control pistons, an independently operable magnet for each control valve operative upon energization to release the related control valve to interrupt transfer of liquid between related control chambers, said control piston cycling means being operative through the actuated control pistons to displace liquid through said first hydraulic column to displace said setup piston an equal amount, said displaced setup piston being operative to transfer a quantity of liquid on the opposite side thereof through said second hydraulic column and actuated control valves to the effected control piston, said control piston cycling means being further operative to return the displaced liquid to said opposite side of said chamber on the return cycle to return said setup piston to starting position, said reciprocating means being operative upon return movement to relatch said control valve in position to permit transfer of liquid between said related control chambers, and means for periodically applying liquid under pressure to said chamber on both sides of said setup piston to maintain a substantially constant volume of liquid therein.

19. The combination as claimed in claim 18 wherein said last-named means includes a pair of liquid make up valves, one for each side of said setup piston, and cam means for sequentially opening said make up valves to insure return of the setup piston to the starting position.

20. In a hydraulic control system, the combination of a driven piston normally disposed within a driven piston chamber at a starting position against a stop and adapted to be hydraulically moved to and held at any one of a predetermined number of positions, a plurality of pairs of opposed control pistons, said opposed control pistons each being disposed in an individual control chamber with each pair of said control pistons being independently displaceable preselected increments, means for reciprocating said pairs of opposed control pistons in synchronism and in the same direction, means for parallel connecting the control chambers of one of each of said pairs of opposed control pistons to one side of said driven piston chamber to provide a first hydraulic column, control valve means for hydraulically connecting the opposed control piston chambers to maintain said driven piston stationary as said opposed control pistons are reciprocated, means for parallel connecting the other side of said driven piston chamber to said control valve means through a second hydraulic column, means for selectively operating said control valve means to close the hydraulic connection between the control chambers of the actuated control valve means, said first hydraulic column directing the displaced liquid from said effected control chambers to displace said driven piston an equal number of increments, said driven piston displacing a like quantity of liquid through said second hydraulic column and operated control valve means to the opposed control piston chambers, said driven piston being returned to said stop by displacement of the fluid in second hydraulic column during the return stroke of said control pistons, means for actuating said control valve means to hydraulically connect said opposed control piston chambers, and means for periodically supplying liquid under pressure to said first and second hydraulic columns at both sides of said driven piston to maintain a constant volume of liquid in both hydraulic columns, said last-named means being operative to supply the liquid to said second hydraulic column prior to said first hydraulic column to maintain said driven piston against said stop.

*21. In a fluid control system, an input for receiving fluid under pressure, an output for providing output fluid flow, a plurality of conduits coupled in parallel between said input and output, means individual to at least two of said conduits for controlling fluid flow through the several ones thereof in proportion to successive digital orders, and means for selectively permitting flow through the several ones of said conduits.*

*22. A fluid control system comprising means for providing a plurality of fluid flow paths having a predetermined digital relation of fluid flow therein, means for permitting the fluid flow through a combination of said paths selected in accordance with a binary coded signal, and means for combining the fluid flow from said paths.*

*23. A fluid flow digital to analog converter comprising means for selectively permitting a plurality of fluid flows related in accordance with a digital code, means for receiving a plurality of electric signals corresponding individually to the digits of a digitally coded signal, means responsive to individual ones of said electric signals for controlling individual ones of said fluid flow, and means for combining said flows.*

*24. A digital to analog converter comprising means responsive to a digitally coded signal for providing a plurality of fluid flows corresponding respectively to the digits of said coded signal, and means for combining said fluid flows.*

*25. In a fluid control system, an inlet chargeable with fluid under pressure, an outlet, a plurality of conduits ararranged in parallel and each extending from said inlet to said outlet, movable abutment means interposed in each conduit for substantially sealingly isolating fluid in the inlet from fluid in the outlet, means for preadjusting the degree of permissible displacement of each movable abutment means in proportion to successive digital orders, and means for selectively permitting fluid from the inlet to flow via selected conduits to cause each associated movable abutment means to move through its preadjusted displacement and thereby displace a corresponding aggregate volume of fluid toward the outlet.*

*26. A fluid control system comprising an inlet containing fluid under pressure; an outlet; a plurality of means, each including a displaceable member, interposed in respective conduits arranged in parallel and extending between the inlet and outlet and each sealingly isolating fluid in the inlet from that in the outlet and displaceable successively different amounts proportional to successive digital orders; and separate selectively operable valve means interposed in each conduit for controlling flow of pressure fluid from the inlet toward the outlet via such conduit, whereby the total volume of pressure fluid displaced toward the outlet by the various displaceable members will vary according to the number of said valve means which are concurrently operated.*

*27. A fluid control system comprising one conduit containing fluid under pressure, another conduit for receiving pressure fluid to cause a desired control operation to be performed, each of said conduits having a plurality of branches; a separate displaceable member interposed between and sealingly isolating fluid in the respective branches of the one conduit from the fluid in corresponding branches of the other conduit; means for preselecting the displacements of the various members toward said other conduit to different amounts proportional to successive binarily weighted digital orders; and selectively operable means interposed in the respective branches associated with either of the conduits to control fluid connection of each such conduit with the corresponding displaceable member, said selectively operable means being normally conditioned for causing the respective displaceable members to be urged toward said one conduit and conditionable for causing selected ones of said members to displace corresponding volumes of fluid through said other conduit.*

References Cited by the Examiner

The following references, cited by the Examiner, are of record in the patented file of this patent or the original patent.

UNITED STATES PATENTS

| | | | |
|---|---|---|---|
| 549,809 | 11/95 | Mesta | 121—46 |
| 1,714,528 | 5/29 | Staggs | 60—54.5 |
| 1,895,732 | 1/33 | Rosenkranz | 121—38 |
| 1,934,207 | 11/33 | Pennock | 60—97 |
| 2,217,783 | 10/40 | Bell | 60—97 |
| 2,229,903 | 1/41 | Schmohl | 91—31 |
| 2,240,287 | 4/41 | Croll | 60—54.5 |
| 2,296,864 | 9/42 | Morrison | 60—54.5 |
| 2,361,326 | 10/44 | Silver | 60—54.5 X |
| 2,437,821 | 3/48 | Hughes | 60—54.5 |
| 2,613,703 | 10/52 | Calvert | 121—38 |
| 2,756,038 | 7/56 | Barrett | 60—54.5 X |

FRED E. ENGELTHALER, *Primary Examiner.*

KARL J. ALBRECHT, RALPH H. BRAUNER, *Examiners.*